UNITED STATES PATENT OFFICE.

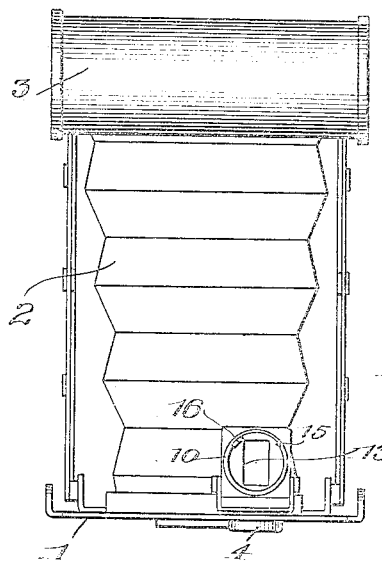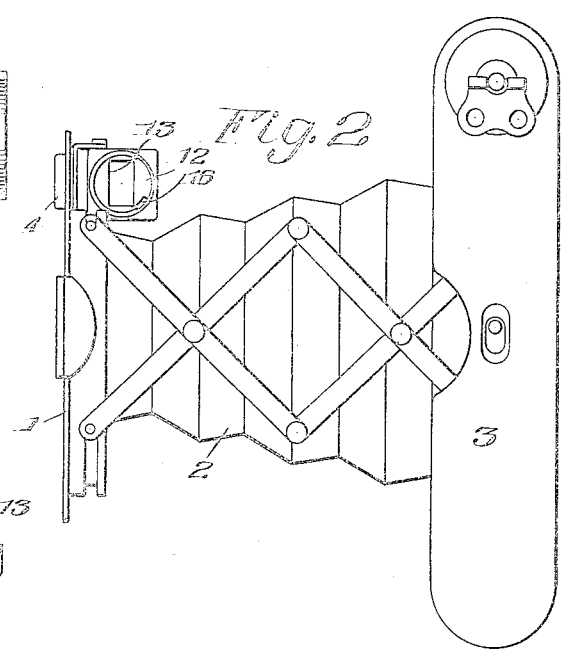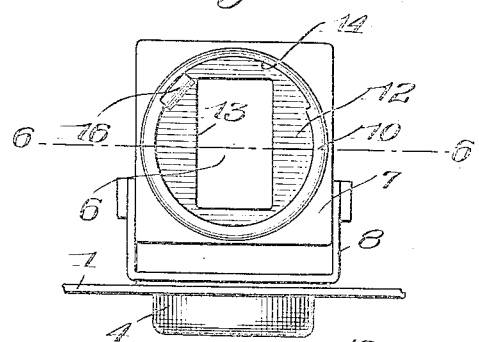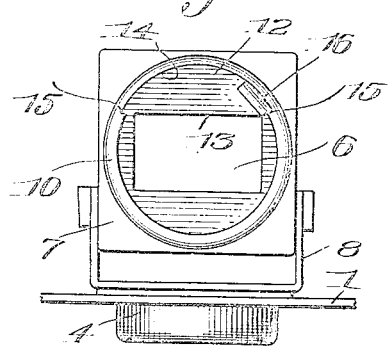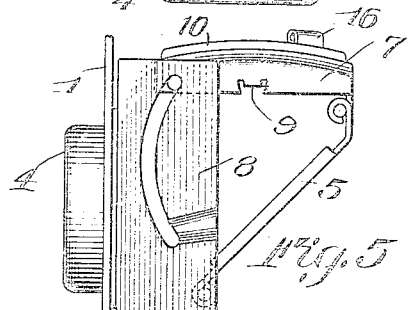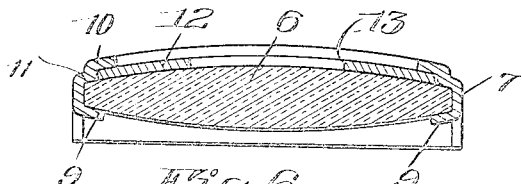

WILLIAM A. RIDDELL, OF ROCHESTER, NEW YORK, ASSIGNOR TO EASTMAN KODAK COMPANY, OF ROCHESTER, NEW YORK, A CORPORATION OF NEW YORK.

VIEW-FINDER.

1,205,393.   Specification of Letters Patent.   Patented Nov. 21, 1916.

Application filed September 28, 1914.   Serial No. 863,810.

*To all whom it may concern:*

Be it known that I, WILLIAM A. RIDDELL, of Rochester, in the county of Monroe and State of New York, have invented certain new and useful Improvements in View-Finders; and I do hereby declare the following to be a full, clear, and exact description of the same, reference being had to the accompanying drawings, forming a part of this specification, and to the reference numerals marked thereon.

My present invention relates to photography and more particularly to view finders for photographic cameras, and it has for its object to provide a simple and efficient construction of finder for use in connection with cameras having an elongated field of exposure that may receive the image with the greater dimension of the field disposed either vertically or horizontally, the idea being to so equip the finder that it will similarly reflect the object within a correspondingly shaped field having its greater dimension similarly disposed so that both images will comprise the same subject matter though one is greatly reduced in size.

The improvements are further directed toward making the finder easy to manipulate and to so add to its functions without greatly modifying its general construction.

To these and other ends the invention resides in certain improvements and combinations of parts all as will be hereinafter more fully described, the novel features being pointed out in the claims at the end of the specification.

In the drawings, Figure 1 is a top plan view of a camera provided with a finder constructed in accordance with and illustrating one embodiment of my invention, the camera being in position to take a picture of greater vertical than horizontal dimensions; Fig. 2 is a similar view of the camera when shifted onto its side to take a picture of greater horizontal than vertical dimensions, the finder having been also shifted to still throw the image in a vertical direction; Figs. 3 and 4 are plan views of the finder, enlarged, with its diaphragm adjusted to different positions; Fig. 5 is a side elevation of the finder, and Fig. 6 is a sectional view through the reflecting element taken substantially on the line 6—6 of Fig. 3.

Similar reference numerals throughout the several figures indicate the same parts.

The camera illustrated is of a familiar type and while the field of exposure is not shown in detail, it is thought that the arrangements thereof will be readily understood when it is said that the field corresponds proportionally to the two dimensions of the camera body so that when the camera is held in the position of Fig. 1, the greater dimensions of the field will be vertical and when held in the position of Fig. 2, the greater dimension will be horizontal. The camera front is indicated by 1, the bellows by 2 and the body by 3.

The finder is preferably mounted to rotate bodily upon the front plate 1 as by journaling the tube 4 of its front or field lens in a suitable aperture in said plate. Thus, as the camera is shifted between the positions of Fig. 1 and Fig. 2, the finder may also be shifted to agree and to still project the image in a vertical direction so that it may be viewed by the operator from above by rotating it on an axis coincident with the optical axis of its field lens.

The image cast by the field lens is reflected by the usual angle mirror 5 onto the upper reflecting element 6 in which it is viewed. This element is preferably in the form of a double convex lens which, in the present instance, is circular and is held within an upper frame 7 which frame is supported by the main frame 8 and by the frame of the mirror 5 which is in turn connected to the main frame as shown.

The upper frame 7 has a seat for the lens 6 that is constituted by a lower inturned flange 9 on which the edge of the lens rests at each side and an upper continuous flange 10 that overlaps the edge of the lens at a point above. This flange 10 has a portion 11 that directly engages the lens, but its edge portion is offset, as shown.

Superposed upon the lens 6 and confined between it and the said offset portion of the flange 10 is a thin spherical diaphragm or mask 12 which is also circular, being preferably a thin metal disk, and which is adapted to rotate through at least 90° while otherwise securely held in position. The diaphragm has an elongated central opening 13, the dimensions of which are proportioned relatively to accord with the relative proportions of the field of exposure of the camera. The flange 10 has a cutaway portion 14 throughout approximately 90° of its circumference which cutaway portion provides two shoulders 15. An upstanding finger portion 16 on the diaphragm within the confines of the frame traverses the cutaway portion as the diaphragm is shifted and engages the respective shoulders as limiting stops.

The manner of use will be apparent, it is thought. When the finger-piece 16 is against one stop 15, the diaphragm will have the short side of its opening 13 parallel with the focal plane of the camera and the finder is used in this position of adjustment when the camera is held with the greater dimension of its field vertical and its lesser dimension horizontal, as shown in Fig. 1. Thus, the field of the image is the same shape both in the case of the finder and the camera and a subject of great vertical extent can be photographed to the best advantage. When the camera is turned, as in Fig. 2, to more effectively record a subject of great horizontal extent, the finder is rotated and the diaphragm is also rotated through 90° until the finger-piece 16 engages the other stop 15 whereupon the greater dimension of the opening 13 will be parallel with the focal plane.

I claim as my invention:

1. In a view finder, the combination with a circular element in which the image is viewed and a frame or holder therefor having an annular flange overhanging the margin of the element, of a rotatable mask or diaphragm carried by said frame by being confined between the flange thereof and the element to slide on the face of the latter and having an elongated opening therein whereby the greater dimension of the field of the image may be shifted from the vertical to the horizontal, or vice versa as the diaphragm is rotated for the purposes set forth.

2. In a view finder, the combination with a circular element in which the image is viewed and a frame or holder therefor having an annular flange overhanging the margin of the element, a portion of the edge of said flange being cut away to form a pair of shoulders, of a rotatable mask or diaphragm carried by said frame by being confined between the flange thereof and the element to slide on the surface of the latter and having an elongated opening therein for the purposes set forth, and an upstanding finger portion on the diaphragm arranged within the confines of the frame and adapted to engage the respective shoulders on the flange thereof as limiting stops when the diaphragm is rotated in opposite directions.

WILLIAM A. RIDDELL.

Witnesses:
JOHN A. ROBERTSON,
BURT MOHLAR.